United States Patent [19]

Tsao

[11] 4,002,719
[45] Jan. 11, 1977

[54] RECOVERY OF NICKEL AND COBALT CARBONATES FROM AMMONIACAL LEACH SOLUTIONS

[75] Inventor: Utah Tsao, Jersey City, N.J.

[73] Assignee: The Lummus Company, Bloomfield, N.J.

[22] Filed: Sept. 22, 1975

[21] Appl. No.: 615,801

[52] U.S. Cl. .............................. 423/144; 423/419
[51] Int. Cl.² ........................................ C01G 51/06
[58] Field of Search .......... 423/141, 143, 144, 419; 75/103, 119; 203/7, 88, 90, 96

[56] References Cited

UNITED STATES PATENTS

| 1,455,299 | 5/1923 | Marquard et al. | 203/90 |
| 1,501,876 | 7/1924 | Wreesman | 203/90 |
| 3,141,765 | 7/1964 | Brown et al. | 75/103 |
| 3,248,181 | 4/1966 | Akimoto | 203/7 |
| 3,719,451 | 3/1973 | Burke | 75/103 |

OTHER PUBLICATIONS

Boldt et al., The Winning of Nickel, Longmans Canada Ltd., Toronto, 1967, pp. 326–329.

Primary Examiner—Oscar R. Vertiz
Assistant Examiner—Brian E. Hearn
Attorney, Agent, or Firm—Marn & Jangarathis

[57] ABSTRACT

An ammonium carbonate leach solution containing dissolved nickel and/or cobalt values is sprayed into a flash chamber to flash a portion of the ammonia therefrom, resulting in the production of a fine precipitate of nickel and/or cobalt carbonate. The solution is introduced into a stripping tower wherein remaining ammonia is stripped therefrom to precipitate further nickel and/or cobalt carbonate on the previously precipitated carbonate, which function as nuclei to reduce deposition in the column.

6 Claims, 1 Drawing Figure

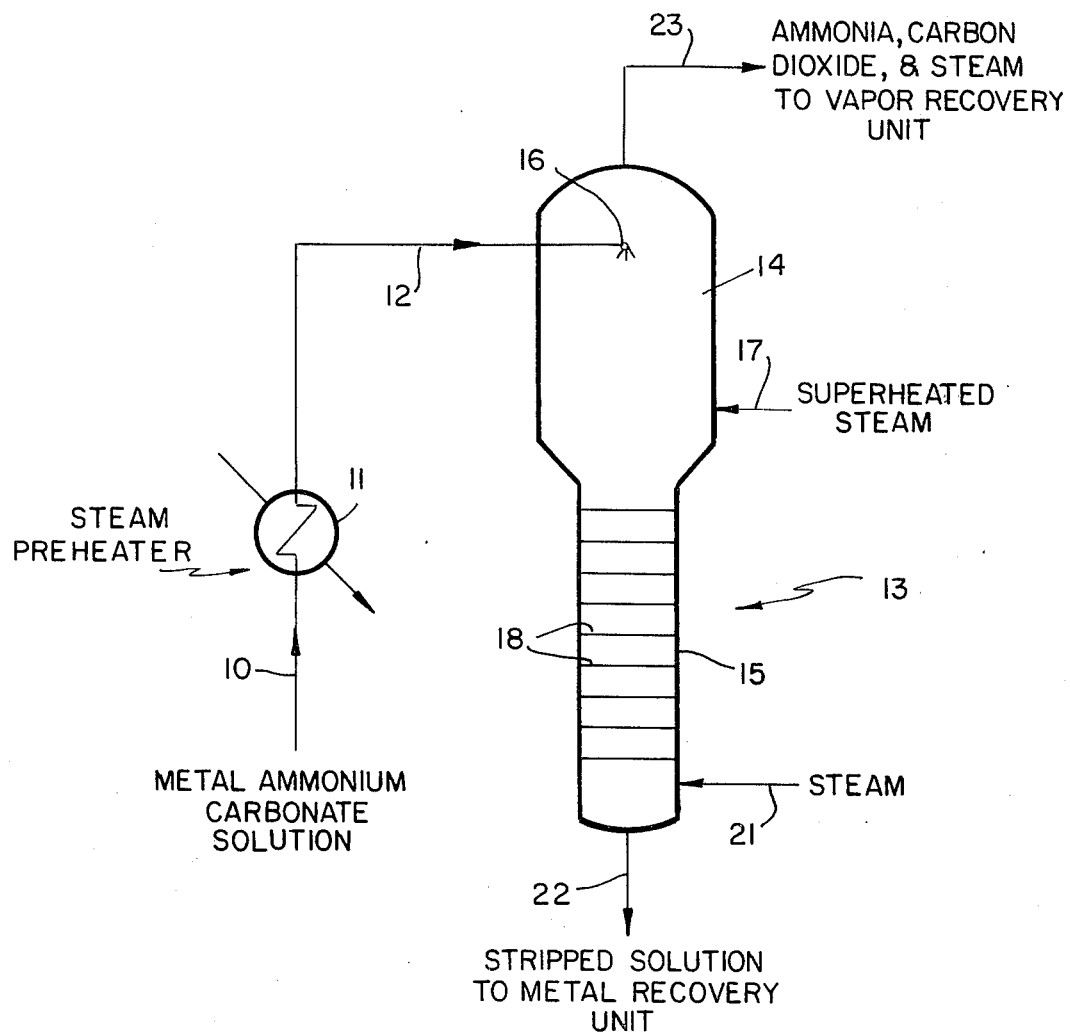

RECOVERY OF NICKEL AND COBALT CARBONATES FROM AMMONIACAL LEACH SOLUTIONS

This invention relates to the recovery of nickel and/or cobalt, and more particularly to the recovery of nickel and/or cobalt from an ammonium carbonate leach solution. Nickel and/or cobalt in reduced ore can be leached from the ore by the use of an ammonium carbonate leach solution. The nickel and/or cobalt can then be recovered from the leach solution by stripping ammonia therefrom whereby the nickel and/or cobalt is precipitated from the solution as an insoluble carbonate (the term carbonate also encompasses the hydroxy carbonate).

In general, the ammonia stripping is effected in a stripping column; however, such stripping has resulted in serious plugging problems as a result of deposition of the carbonates on the column surfaces.

Accordingly, an object of the invention is to provide for improved recovery of nickel and/or cobalt.

Another object is to provide for improved recovery of nickel and/or cobalt from ammonium carbonate leach solution.

A further object of the present invention is to provide for improved recovery of nickel and/or cobalt from ammonium carbonate leach solutions by stripping of ammonia therefrom.

These and other objects of the present invention should be apparent from reading the following description thereof.

In accordance with the present invention, an ammonium carbonate leach solution containing dissolved cobalt and/or nickel values is sprayed into a flash chamber to flash a portion of the ammonia therefrom to precipitate a portion of the dissolved nickel and/or cobalt values as a fine carbonate (the term carbonate includes nickel and/or cobalt hydroxycarbonate) precipitate. The leach solution containing the finely divided nickel and/or cobalt carbonate is introduced into a stripping column wherein further ammonia is stripped from the solution to precipitate further nickel and/or cobalt carbonate. The finely divided nickel and/or cobalt carbonate, previously precipitated, function as nuclei for the additional precipitate, thereby reducing the deposition of the precipitate on the column surfaces.

More particularly, the leach solution is flashed at a temperature of from 150° F to 250° F, preferably 180° F to 220° F, and at a pressure of from 10 to 30 psia, preferably a pressure of from 16 to 20 psia.

The feed to the flash chamber is generally preheated to a temperature of from 110° F to 280° F at a pressure of from 30 to 50 psia. If the heat content of the feed is not sufficient to effect the desired flashing, then additional heat can be provided to the flash chamber; for example, by introducing superheated steam into the flash chamber.

The leach solution is sprayed into the flash chamber to form fine droplets (in the order of 50 to 500 microns) whereby upon vaporization of ammonia in the spray chamber, the nickel and/or cobalt carbonate is precipitated in the droplets to produce a finely divided precipitate.

The leach solution withdrawn from the flash chamber, contains the cobalt and/or nickel carbonate as a suspended fine precipitate and such solution is then introduced into a stripping column to effect further stripping of ammonia and thereby recover further nickel and/or cobalt from the leach solution as precipitated carbonate. The stripping column is operated at temperatures and pressures suitable for stripping ammonia from the solution, and such stripping is preferably effected by use of a stripping gas, such as steam. Temperatures for stripping are generally in the order of 220° F to 235° F, and pressures are generally in the order of 10 to 30 psia; however, it is to be understood that the present invention is not limited to such conditions.

The stripping column includes sieve plates or trays having downcomers of sufficient size to permit the solution including precipitate to pass therethrough. The previously precipitated finely divided metal carbonate function as nuclei in the column for additionally precipitated cobalt and/or nickel carbonate, thereby greatly reducing the deposition of carbonate on the surfaces of the column which are in contact with the leach solution.

The ammonium carbonate leach solution containing dissolved nickel and/or cobalt values is obtained by procedures known in the art, and the procedures for obtaining such leach solutions form no part of the present invention.

It is also to be understood that the procedure of the present invention is also applicable to the controlled precipitation of leach solutions containing nickel and cobalt, to initially precipitate essentially only the nickel carbonate, followed by separation of the nickel carbonate and further stripping the solution to recover the cobalt carbonate. In such a modification, the ammoniacal solution is flashed and stripped to precipitate nickel carbonate, and subsequent to separation of the nickel carbonate, the solution is flashed and stripped to recover the cobalt carbonate.

The invention will be further described with respect to an embodiment thereof illustrated in the drawing wherein:

The drawing is a simplified schematic flow diagram of an embodiment of the present invention.

Referring to the drawing, an ammonium carbonate leach liquor containing dissolved nickel values, dissolved cobalt values or mixtures thereof, in line 10, is pre-heated in a heat exchanger 11, and the heated solution, in line 12, introduced into a column 13, including an upper flash chamber 14 and a lower stripping column 5. The solution in line 12 is introduced into the flash chamber 14 through a spray device 16 whereby the solution is formed into droplets.

In flash chamber 14, which includes a line 17 for introducing superheated steam, if required, ammonia is vaporized, whereby nickel and/or cobalt carbonate is precipitated in the droplets to form a finely divided precipitate.

The solution, including finely divided precipitate, is collected at the bottom of chamber 14 and introduced into the stripping column 15, including a plurality of sieve trays 18, having downcomers of a size sufficient to permit passage of the solution therethrough.

A stripping gas, such as steam, is introduced into the bottom of the stripping column 15 through line 21. In stripping column 15 further ammonia is stripped from the solution, and the finely divided precipitate function as nuclei for the additional precipitate formed in the stripping column 15 thereby reducing deposition of precipitate on surfaces of the column.

A stripped solution containing the precipitated metal carbonate is withdrawn from column 15 through line 22 for further treatment to recover the cobalt and/or nickel as known in the art.

A gaseous overhead, containing ammonia, water vapor and carbon dioxide, both flashed and stripped from the solution, is withdrawn from flash chamber 14 through line 23 for recovery of various components.

The invention will be further described with respect to the following example, however, it is to be understood that the scope of the invention is not to be limited thereby.

EXAMPLE

An ammonia carbonate leach solution containing 1 % of dissolved nickel, 5 wt. % $CO_2$ and 10 wt. % of $NH_3$ is fed to a stripper at a rate of 250,000 lb/hr. This solution is preheated to 250° F under a pressure of 50 psia without vapor being flashed off the solution. When this solution is flashed into the top of a stripper at 16 psia about 4 wt. % water vapor 0.2 wt. % ammonia and some carbon dioxide will be suddenly released. About 5% (125 lb/hr) of the dissolved metal will be precipitated out of the solution as metal hydroxy carbonate (250 lb/hr). The density of the carbonate is estimated as 200 lb/cu ft. The volume of the precipitated carbonate is 1.25 cu ft. Assuming the precipitated carbonate is in the form of 10 micron sphere the calculated surface area of the carbonate is 230,000 sq. ft. The diameter of the stripper for the stripping of all the ammonia and carbon dioxide is calculated to be 7feet-0inches. The area of the first sieve tray is 38.4 sq. ft. which is only 0.0167% surface area of the precipitate. Therefore, the chance of any additional precipitate to deposit on the trays is tremendously decreased as more ammonia and carbon dioxide is progressively stripped from the solution going down the stripper.

Numerous modifications and variations of the present invention are possible in light of the above teachings and, therefore, within the scope of the appended claims, the invention may be practised otherwise than as particularly described.

What is claimed is:
1. In a process for recovering a member selected from the group consisting of nickel, cobalt and mixtures thereof dissolved in an ammonium carbonate solution by stripping ammonia from the solution in a stripping column to precipitate the carbonate of said member, the improvement comprising:
spraying said solution into a flash chamber in an upper portion of the stripping column to flash a portion of the ammonia therefrom and precipitate a portion of said metal carbonate as a fine precipitate in solution droplets formed in said spraying; and
stripping said solution containing the fine precipitate of metal carbonate in the lower portion of the stripping column wherein further ammonia is stripped from the solution to precipitate further amounts of said metal carbonate, said fine precipitate functioning as nuclei for the precipitated further amounts to reduce deposition of precipitate on column surfaces.

2. The process of claim 1 wherein the solution is flashed in said flash chamber at a temperature of from 150° F to 250° F and a pressure of from 10 to 30 psia.

3. The process of claim 2 wherein said member is nickel.

4. The process of claim 2 wherein said member is cobalt.

5. The process of claim 2 wherein said member is a mixture of cobalt and nickel.

6. The process of claim 2 wherein said spraying produces droplets of from 50 to 500 microns.

* * * * *